Feb. 13, 1951 L. R. ORD 2,541,379
APPARATUS AND METHOD FOR MOLDING RING-LIKE
AND OTHER SHAPED OPEN MEMBERS
Filed March 24, 1947
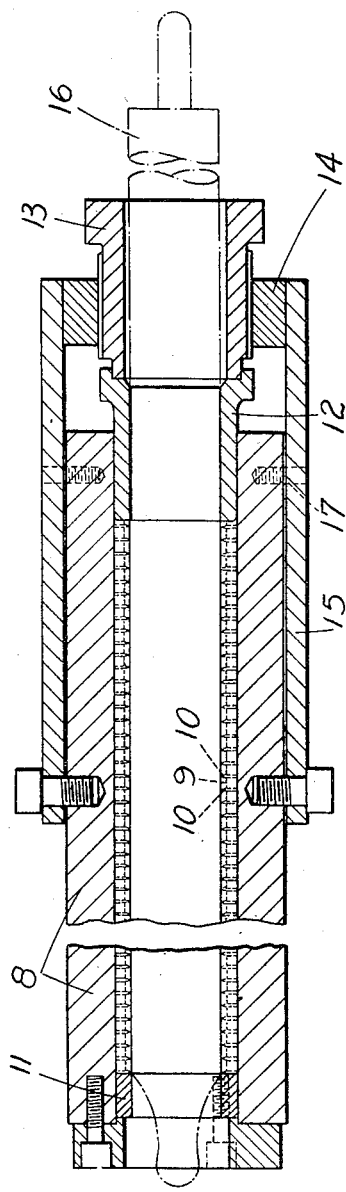
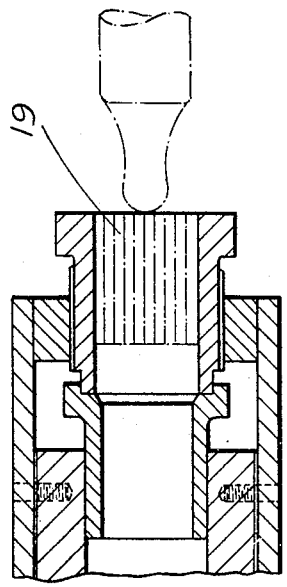
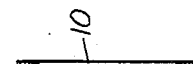
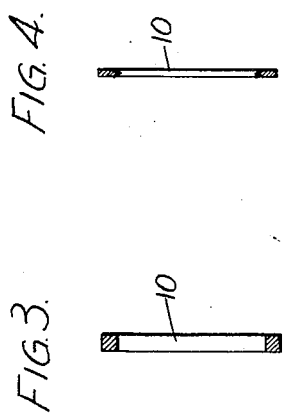
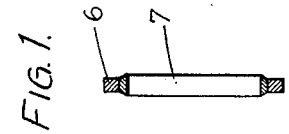
INVENTOR
LEWIS R. ORD,
BY Reynolds & Beade
ATTYS.

Patented Feb. 13, 1951

2,541,379

UNITED STATES PATENT OFFICE 2,541,379

APPARATUS AND METHOD FOR MOLDING RING-LIKE AND OTHER SHAPED OPEN MEMBERS

Lewis Redman Ord, Toronto, Ontario, Canada, assignor to Dowty Equipment Limited, Cheltenham, England, a British company Application March 24, 1947, Serial No. 736,828
In Great Britain March 25, 1946

4 Claims. (Cl. 18—5)

The present invention is an improved method and means for multiple moulding of ring-like or other shaped open members in mould cavities which are defined externally by a plurality of separable spacers axially aligned within a barrel, and internally by a mandrel entering axially through the located spacers, and properly shaped to project, by its advance, a plastic substance contained within the barrel into each individual mould cavity, to fill the latter.

The invention has been devised primarily to deal with quantity production of sealing washers for joint-making packings of the kind in which a resiliently deformable sealing washer, usually of rubber or synthetic rubber, is confined against radial spreading by a substantially rigid confining ring whereto it is bonded or similarly adhered. An example of such a sealing washer is described and illustrated in the specification of the co-pending application for United States Letters Patent Serial No. 605,298, filed in the name of George Herbert Dowty, now Patent No. 2,455,982, and it is with reference to such an embodiment that the invention will be hereinafter more particularly described.

It is an object of the present invention to provide a simple production process by which such composite seals and other ring-like, or open shaped members, may be produced in quantity by comparatively unskilled labour and without the employment of complicated moulds and presses, hence at low cost.

It is a further object of the invention to provide a mould and a moulding process employing means by which the individual cavities of a multicavity mould can be built up a manner which enables them to be subsequently separated to facilitate removal of the finished elements and also to facilitate cleaning of the members defining the cavities, and general servicing of such members for subsequent use.

Further objects of the invention will become apparent from the ensuing description.

In the ensuing drawings in which like reference numerals are employed to designate corresponding parts in the various figures:

Figure 1 is a sectional elevation of a circular composite seal and synthetic rubber washer (hereinafter designated a composite seal of the kind hereinbefore specified) which is a typical example of a product of the process which is the essence of the present invention.

Figure 2 is a sectional elevation of a multicavity mould built up in accordance with the teachings of the present invention, the central mandrel which co-operates with the cavities to define the inside walls thereof being indicated in chain lines, as it would be positioned at completion of the mould-filling operation, and the head of an ejection plunger employed for ejection of the finished elements is also shown at the left in chain lines.

Figure 3 is a sectional elevation of a confining ring which comprises the steel part of the composite seal, of the kind hereinbefore specified, as it is inserted into the mould.

Figure 4 is a sectional elevation of a spacer which is employed to separate each confining ring from its neighbour when assembled in the mould.

Figure 5 is a fragmentary view of the mouth of the mould corresponding to Figure 2 and illustrating how the synthetic rubber strip such as constitutes the mould-filling plastic substance is engaged with entry of the mandrel for forcing the synthetic rubber into the mould cavities.

Referring now to the drawings, Figure 1 illustrates a circular composite seal of the kind hereinbefore specified, wherein the reference numeral 6 serves to indicate the outer steel confining ring in the form of a continuous member surrounding the inner resilient and continuous sealing ring 7, typically of synthetic rubber, the two rings being preferably bonded together in the course of production.

Reference is now directed to Figure 2, read in conjunction with Figures 3 and 4, and it will be seen that the reference numeral 8 has been employed to designate the barrel in which the mould cavities are defined by the insertion of the confining rings 9 and the spacers 10 in alternate relationship, as clearly seen in the drawing. Preferably the external contour of the barrel 8 is square to enable it to be located between heated platens for vulcanizing the rubber or synthetic rubber materials, but the bore of the barrel is normally circular. The barrel 8 is open at each end, having at what may be termed the ejection end, a reduced collar 11 against which one end spacer bears. At the other end, the bore of the barrel is adapted for the reception of the annular pressure head 12, which is adapted to be entered into the mouth of the barrel to be pressed down by screwing up the clamping head 13, which latter has screwed engagement with the cross head 14 carried by the pivoted links 15. In assembly of the mould, the spacers and confining rings, which accurately fit the bore of the barrel 8, are inserted into the bore in alternate fashion, as seen in Figure 2. The next operation is to enter the pressure head 12, and then to engage its outer end by the clamping head 13, which, having been screwed out sufficiently in relation to the cross head 14, is swung round until the links 15 engage the stop pegs, indicated in dotted lines at 17. With the links engaged against the stop pegs 17, it is ensured that the inner end of the clamping head 13 is accurately in register with the pressure head 12. The mandrel 16, seen in chain lines in Figure 2, is then entered through the centre bore of the pressure head 12 and the clamping head 13 and entered until it is axially located in the assembled pack of alternate confining rings and spacers. Entry of the mandrel 16 in that way assists in ensuring true co-axial alignment of the rings and spacers of the pack temporarily before they are finally clamped up tight. The head 13 at the outer end of the clamp is formed as a hexagon nut or is provided with flattened portions or a hole for the insertion of a tommy bar, and tightening up of this clamping head 13 forces the pressure head 12 into the bore of the barrel 8 to ensure that the pack of alternating confining rings and spacers shall be retained in tight contiguous relationship as a complete pack, accurately aligned. After clamping of the pack in that way, the mandrel 16 can be withdrawn.

The next operation is to fill the mould cavities with the rubber or synthetic rubber, and that is quite simply done by first taking a strip of synthetic rubber and rolling it up for insertion into the bore through the clamping head 13 as indicated in chain line at 19 in Figure 5. The mandrel 16 is then entered to force the rubber through the clamping head 13 and the pressure head 12 into the interior of the pack of alternate confining rings and spacers. The entry end of the mandrel is preferably formed with a reduced nose portion flared outwardly at its rear end to a junction with the full diameter of the mandrel, which just fits within the spacers 10. The effect of its entry is that the rubber, resisting axial displacement as it bulges into each mould cavity, but tending to spread radially outwards into each such cavity as the mandrel is entering, is forced radially outwardly in all directions, filling each individual mould cavity as entry of the mandrel continues, until the mandrel is pressed right home to the position in which it is seen in chain lines in Figure 2. Generally speaking, it is necessary to force the mandrel in by a hydraulic press, and preferably the mould, the mandrel and the rubber are heated to facilitate flow of the rubber.

The next operation is one of curing or vulcanizing, for which purpose the barrel, complete with the plunger still fully entered, is put into a hot chamber or held between heated plates. A typical heat treatment for oil resisting synthetic rubber is maintenance of temperature of between 300 and 350 degrees Fahrenheit for approximate half an hour.

After vulcanizing, the clamping head 13 is unscrewed and swung away off the end of the pressure head 12, whereafter the pack is pushed out by inserting the ejection plunger, seen in chain lines in Figure 2, as represented by the reference numeral 18. The head of the ejection plunger is of such dimension that it just engages the end spacer 11. On ejection, the pack is separated leaving the finished composite seals conforming with Figure 1, and the spacers, after cleaning by immersion in a suitable solvent, are ready for use again with a new set of confining rings.

It is preferred that the synthetic rubber sealing rings shall be securely bonded in the confining rings and, to that end, it is preferable to treat the bore of each confining ring with a rubber-to-metal bonding flux, care being taken to ensure that the flux does not get on to the axially directed faces of the confining rings, otherwise the appearance of the finished product may be marred. Alternatively, a secure enough bond may be produced by leaving the bore of each confining ring with a fairly rough surface, or by deliberately roughening the bore. On the other hand, there may be cases in which it is desired to produce synthetic rubber sealing rings, or other rings or shaped open members, without confining rings, in which event no precaution need be taken to secure any sort of bond between the synthetic rubber and the outer ring. In such cases, the synthetic rubber rings can quite easily be separated from the outer rings by the application of slight axial pressure to the rubber.

The invention is not limited to the employment of synthetic resinous materials which come specifically within the classification of synthetic rubbers, for there are obviously many other synthetic resinous materials which, whilst not being strictly speaking synthetic rubbers, have an adequate degree of resilience for joint-making packings, and yet again the invention is not even limited to the production of sealing rings for it might well find useful application in the production of non-resilient rings or other shaped open members.

I claim:

1. The method of moulding rings in an elongated axially alined series of inwardly opening annular mold cavities defined by a series of spaced confining rings and interposed spacing rings and disposed to form a hollow open-ended cylinder, said method comprising placing at one end of said cylinder a charge of moldable material in excess of the amount required to fill said cavities, exerting pressure against said charge axially of said cylinder in a direction to force the same into and through said cylinder by an end of a mandrel contacting said charge and formed at the charge-contacting end thereof to effect radial spreading of the charge, said charge being of such volume and of such plasticity as to set up a resistance to its passage through said cylinder and a back pressure against its advance by said mandrel sufficient to cause portions of the charge to enter and to successively fill said mold cavities as said charge is advanced through said cylinder, said mandrel rearwardly of its charge-engaging end being of substantially the same external diameter as the internal diameter of said spacing rings so as to advance through said cylinder all of said charge in excess of the amount required to fill said mold cavities and to eject the excess amount from the other end of said cylinder, said other end of said cylinder being free of any obstruction during passage of the charge through said cylinder.

2. Ring moulding apparatus comprising a barrel, a pack of alternate confining and spacing rings within and held by said barrel in axial alinement with the latter and defining an open-ended cylinder, said spacing rings being of smaller internal diameters than said confining rings for cooperation with the latter to form inwardly opening mould cavities, means clamping all of said rings together and removably securing them in said barrel, and a mandrel operable to force moldable material through said cylinder and to effect spreading of the same into said mold cavities.

3. Ring moulding apparatus comprising a barrel, a pack of alternate confining and spacing rings within and held by said barrel in axial alinement with the latter and defining an open-ended cylinder, said spacing rings being of smaller internal diameters than said confining rings for cooperation with the latter to form inwardly opening mould cavities, stop means fixed with respect to said barrel and against which one end of said pack of rings abuts, screw means reacting from said barrel against the other end of said pack of rings to clamp said pack of rings against said abutment and to removably secure said pack of rings in said barrel, and a mandrel operable to force moldable material through said cylinder and to effect spreading of the same into said mold cavities.

4. Apparatus as set forth in claim 3 in which the screw means is carried by a yoke pivoted to the barrel for swinging movement to shift the screw means between an operative position in which it is effective to clamp the pack of rings and an inoperative position in which it is disposed to permit free removal of the rings from the barrel.

LEWIS R. ORD.

REFERENCES CITED

The following references are of record in the file of this patent:

UNITED STATES PATENTS

| Number | Name | Date |
|--------|------|------|
| 500,463 | Bache | June 27, 1893 |
| 1,658,567 | MacDonald | Feb. 7, 1928 |